US012793446B2

(12) United States Patent
Choi

(10) Patent No.: US 12,793,446 B2
(45) **Date of Patent: *Nov. 10, 2026**

(54) APPARATUS AND METHOD FOR RECOGNIZING FORMALIZED CHARACTER SET BASED ON WEAKLY SUPERVISED LOCALIZATION

(71) Applicant: ELECTRONICS AND TELECOMMUNICATIONS RESEARCH INSTITUTE, Daejeon (KR)

(72) Inventor: Bum-Suk Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 205 days.

This patent is subject to a terminal disclaimer.

(21) Appl. No.: 18/796,527

(22) Filed: Aug. 7, 2024

(65) Prior Publication Data

US 2024/0395057 A1 Nov. 28, 2024

Related U.S. Application Data

(63) Continuation of application No. 17/520,798, filed on Nov. 8, 2021, now Pat. No. 12,142,063.

(30) Foreign Application Priority Data

Mar. 11, 2021 (KR) ........................ 10-2021-0031995

(51) Int. Cl.
*G06K 9/62* (2022.01)
*G06F 18/214* (2023.01)
(Continued)

(52) U.S. Cl.
CPC ............ *G06V 20/62* (2022.01); *G06F 18/214* (2023.01); *G06N 3/04* (2013.01)

(58) Field of Classification Search
CPC ...... G06V 20/62; G06V 10/82; G06V 30/245; G06V 20/625; G06F 18/214; G06N 3/04;
(Continued)

(56) References Cited

U.S. PATENT DOCUMENTS 8,548,201 B2 10/2013 Yoon et al.
10,963,719 B1 * 3/2021 Hantehzadeh ........... G06N 3/08
(Continued)

FOREIGN PATENT DOCUMENTS

CN 112016556 A * 12/2020 ........... G06F 18/214
KR 10-2012-0023485 A 3/2012
(Continued)

OTHER PUBLICATIONS

C. Henry et al., 'Multinational License Plate Recognition Using Generalized Character Sequence Detection,' IEEE Access vol. 8, 2020 (Feb. 28, 2020.).

*Primary Examiner* — Van D Huynh
(74) *Attorney, Agent, or Firm* — Rabin & Berdo, P.C.

(57) ABSTRACT

Disclosed herein are an apparatus and a method for recognizing a formalized character set based on weakly supervised localization. The formalized character set recognition apparatus based on weakly supervised localization may include memory for storing at least one program; and a processor for executing the program, wherein the program performs recognizing one or more numerals present in a formalized character set image and a number of appearances of each of the numerals, extracting a class activation map in which a location of attention in the formalized character set image is indicated when a specific numeral is recognized, and outputting a formalized character set number in which numerals recognized based on the extracted class activation map are arranged.

17 Claims, 5 Drawing Sheets

(51) Int. Cl.
*G06N 3/04* (2023.01)
*G06V 20/62* (2022.01)

(58) Field of Classification Search
CPC .... G06N 3/045; G06N 3/0464; G06N 3/0895; G06T 2207/20081; G06T 2207/20084
See application file for complete search history.

(56) References Cited

U.S. PATENT DOCUMENTS

| | | | | |
|---|---|---|---|---|
| 2012/0106802 | A1* | 5/2012 | Hsieh | G06V 20/63 382/105 |
| 2013/0182910 | A1 | 7/2013 | Burry et al. | |
| 2017/0011279 | A1* | 1/2017 | Soldevila | G06F 16/5846 |
| 2018/0121744 | A1* | 5/2018 | Kim | G06V 10/993 |
| 2022/0101037 | A1* | 3/2022 | Chua | G06F 18/2415 |
| 2022/0237403 | A1* | 7/2022 | Zhou | G06F 18/25 |

FOREIGN PATENT DOCUMENTS

| | | | | |
|---|---|---|---|---|
| KR | 10-1824446 | B1 | 2/2018 | |
| KR | 10-2019-0058863 | A | 5/2019 | |
| KR | 20210001890 | A | 1/2021 | |
| WO | WO-2020248471 | A1 * | 12/2020 | G06F 18/214 |

* cited by examiner

APPARATUS AND METHOD FOR RECOGNIZING FORMALIZED CHARACTER SET BASED ON WEAKLY SUPERVISED LOCALIZATION

CROSS REFERENCE TO RELATED APPLICATION

This application is a continuation of U.S. application Ser. No. 17/520,798, filed on Nov. 8, 2021, which claims the benefit of Korean Patent Application No. 10-2021-0031995, filed on Mar. 11, 2021, which is hereby incorporated by reference in its entirety into this application.

BACKGROUND OF THE INVENTION

1. Technical Field

The following embodiments relate generally to technology for recognizing a formalized character set, and more particularly, to technology for recognizing a formalized character set based on deep learning.

2. Description of the Related Art

The most important information required in order to trace a car of a crime suspect is a license plate. A special Closed Circuit Television (CCTV) for automatically recognizing license plates can clearly acquire numbers, but such a special CCTV has not yet been widely installed on roads. Therefore, there are many cases where most images obtained by capturing the license plate number of a vehicle are black-box images captured by a normal CCTV for crime prevention or captured by a nearby vehicle at the location of an accident.

However, such images have poor image quality in most cases, thus making it difficult to identify the license plate number of the vehicle from the images. In particular, in the case of images captured at night or under bad weather conditions or images having severe motion blur, identification is often impossible, even by human eyes.

Meanwhile, in the past, in order to recognize the license plate number of a vehicle from a license plate image, an Optical Character Recognition (or Reader) (OCR) scheme has mainly been used. This scheme is a method of sequentially recognizing characters from an image one by one in a sliding-window manner. Therefore, there is a disadvantage in that a long time is required in order to recognize a license plate image.

PRIOR ART DOCUMENTS

Patent Documents (Patent Document 1) Korean Patent No. 10-1824446

SUMMARY OF THE INVENTION

An embodiment is intended to improve reading performance for a formalized character set, such as a license plate even for a low-quality image.

An embodiment is intended to improve reading speed for a formalized character set compared to a conventional OCR scheme.

An embodiment is intended to enable reading of new types of formalized character set that are not included in learned data.

In accordance with an aspect, there is provided a formalized character set recognition apparatus based on weakly supervised localization, including memory for storing at least one program, and a processor for executing the program, wherein the program performs:

recognizing one or more numerals present in a formalized character set image and a number of appearances of each of the numerals, extracting a class activation map in which a location of attention in the formalized character set image is indicated when a specific numeral is recognized, and outputting a formalized character set number in which numerals recognized based on the extracted class activation map are arranged.

Recognizing the one or more numerals and the number of appearances may be performed based on a pre-trained deep-learning neural network model, and the program may be configured to train the deep-learning neural network model by performing generating training data labeled with one or more numerals included in each of multiple formalized character set images and a number of appearances of each of the numerals, and configuring a deep-learning neural network, inputting the generated training data to the deep-learning neural network, and then repeatedly updating parameters of the deep-learning neural network so that errors between one or more numerals and a number of appearances of each of the numerals, output from the deep-learning neural network, and the labeled numerals and the number of appearances of each of the labeled numerals are minimized.

Generating the training data may include converting a formalized character set number included in the corresponding formalized character set image into a number of appearances of each of numerals ranging from '0' to '9', and converting converted numbers of appearances of respective numerals into a one-hot vector, thus finally labeling the training data.

The deep-learning neural network model may include a first layer for extracting features of the input formalized character set image, and a second layer for calculating probabilities for respective classes based on the extracted features and outputting the class having maximum probability values.

Extracting the class activation map may include hooking output of the first layer of the pre-trained deep-learning neural network model and extracting the class activation map.

Extracting the class activation map may include extracting a number of class activation maps identical to a number of numerals present in the corresponding formalized character set.

Outputting the formalized character set number may include determining a location of attention in the class activation map, extracted at a time of recognizing the specific numeral, to be a location of the corresponding specific numeral on the formalized character set.

Outputting the formalized character set number may include analyzing information about a two-dimensional (2D) peak of each numeral, present in a formalized character set, in the class activation map, and determining a location of the corresponding numeral.

In accordance with another aspect, there is provided a formalized character set recognition method based on weakly supervised localization, including recognizing one or more numerals present in a formalized character set image and a number of appearances of each of the numerals, extracting a class activation map in which a location of attention in the formalized character set image is indicated when a specific numeral is recognized, and outputting a formalized character set number in which numerals recognized based on the extracted class activation map are arranged.

Recognizing the one or more numerals and the number of appearances may be performed based on a pre-trained deep-learning neural network model, and the deep-learning neural network model may be trained by performing generating training data labeled with one or more numerals included in each of multiple formalized character set images and a number of appearances of each of the numerals, and configuring a deep-learning neural network, inputting the generated training data to the deep-learning neural network, and then repeatedly updating parameters of the deep-learning neural network so that errors between one or more numerals and a number of appearances of each of the numerals, output from the deep-learning neural network, and the labeled numerals and the number of appearances of each of the labeled numerals are minimized.

Generating the training data may include converting a formalized character set number included in the corresponding formalized character set image into a number of appearances of each of numerals ranging from '0' to '9', and converting converted numbers of appearances of respective numerals into a one-hot vector, thus finally labeling the training data.

The deep-learning neural network model may include a first layer for extracting features of the input formalized character set image, and a second layer for calculating probabilities for respective classes based on the extracted features and outputting the class having maximum probability values.

Extracting the class activation map may include hooking output of the first layer of the pre-trained deep-learning neural network model and extracting the class activation map.

Extracting the class activation map may include extracting a number of class activation maps identical to a number of numerals present in the corresponding formalized character set.

Outputting the formalized character set number may include determining a location of attention in the class activation map, extracted at a time of recognizing the specific numeral, to be a location of the corresponding specific numeral on the formalized character set.

Outputting the formalized character set number may include analyzing information about a two-dimensional (2D) peak of each numeral, present in a formalized character set, in the class activation map, and determining a location of the corresponding numeral.

In accordance with a further aspect, there is provided a formalized character set recognition method based on weakly supervised localization, including recognizing one or more numerals present in a formalized character set image and a number of appearances of each of the numerals based on a pre-trained deep-learning neural network model, extracting a class activation map in which a location of attention in the formalized character set image is indicated when a specific numeral is recognized, and outputting a formalized character set number in which numerals recognized based on the extracted class activation map are arranged, wherein the deep-learning neural network model is pre-trained with training data that is labeled with one or more numerals included in each of multiple formalized character set images and a number of appearances of each of the numerals.

The deep-learning neural network model may include a first layer for extracting features of the input formalized character set image, and a second layer for calculating probabilities for respective classes based on the extracted features and outputting the class having maximum probability values, and extracting the class activation map may include hooking output of the first layer of the pre-trained deep-learning neural network model and extracting the class activation map.

Extracting the class activation map may include extracting a number of class activation maps identical to a number of numerals present in the corresponding formalized character set.

Outputting the formalized character set number may include analyzing information about a two-dimensional (2D) peak of each numeral, present in a formalized character set, in the class activation map, and determining a location of the corresponding numeral.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
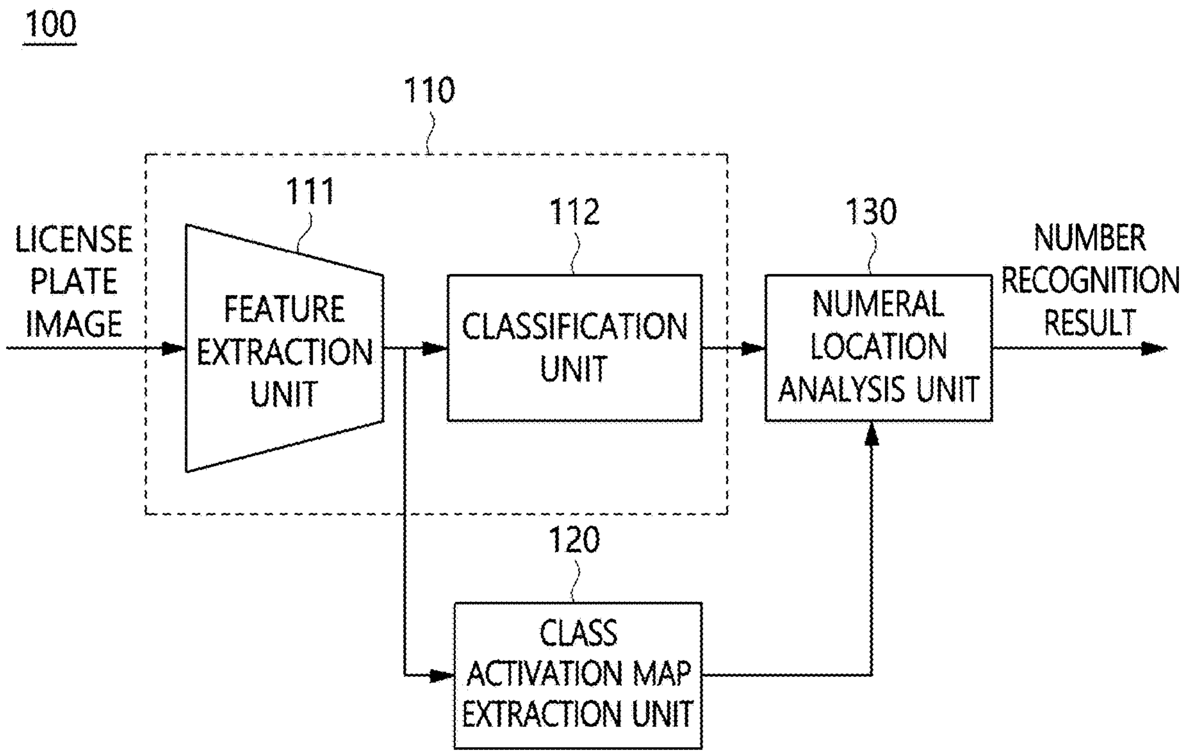
FIG. 1 is a schematic block configuration diagram of a license plate recognition apparatus based on weakly supervised localization according to an embodiment.

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

Hereinafter, an apparatus and a method for recognizing a formalized character set based on weakly supervised localization (hereinafter also referred to as a "formalized character set recognition apparatus and method based on weakly supervised localization") will be described in detail with reference to FIGS. 1 to 7.

Deep-learning technology has come to be widely used as technology ranging from simple handwriting recognition to categorization of objects across an extensive image, as in the case of ImageNet. Recently, research into technology for converting a low-resolution image into a high-resolution image has also been conducted as the deep-learning technology.

Among various types of deep-learning technologies, weakly supervised localization technology is a scheme for training a deep-learning model to merely determine whether an object is present and allowing the deep-learning model trained in this way to localize a specific object by utilizing the location to which attention is paid in an image based on the class ID of the specific object, instead of utilizing Region of Interest (ROI) information in learning for object detection (detection of the location of an object in an image).

The formalized character set recognition apparatus and method based on weakly supervised localization according to the embodiment proposes technology for recognizing the entire formalized character set image at one time based on weakly supervised localization technology, rather than based on OCR, which is generally used for formalized character set recognition.

Hereinafter, although the recognizing the license plate is illustrated, this is only an example provided for a better understanding of the invention, and the present invention is not limited thereto. That is, the present invention can be applied to, for example, recognizing a code form consisting of a formalized character set, such as a resident number, a phone number, and a barcode.

Figure 2:
FIG. 2 is a diagram illustrating an example of a license plate.
Figure 3:
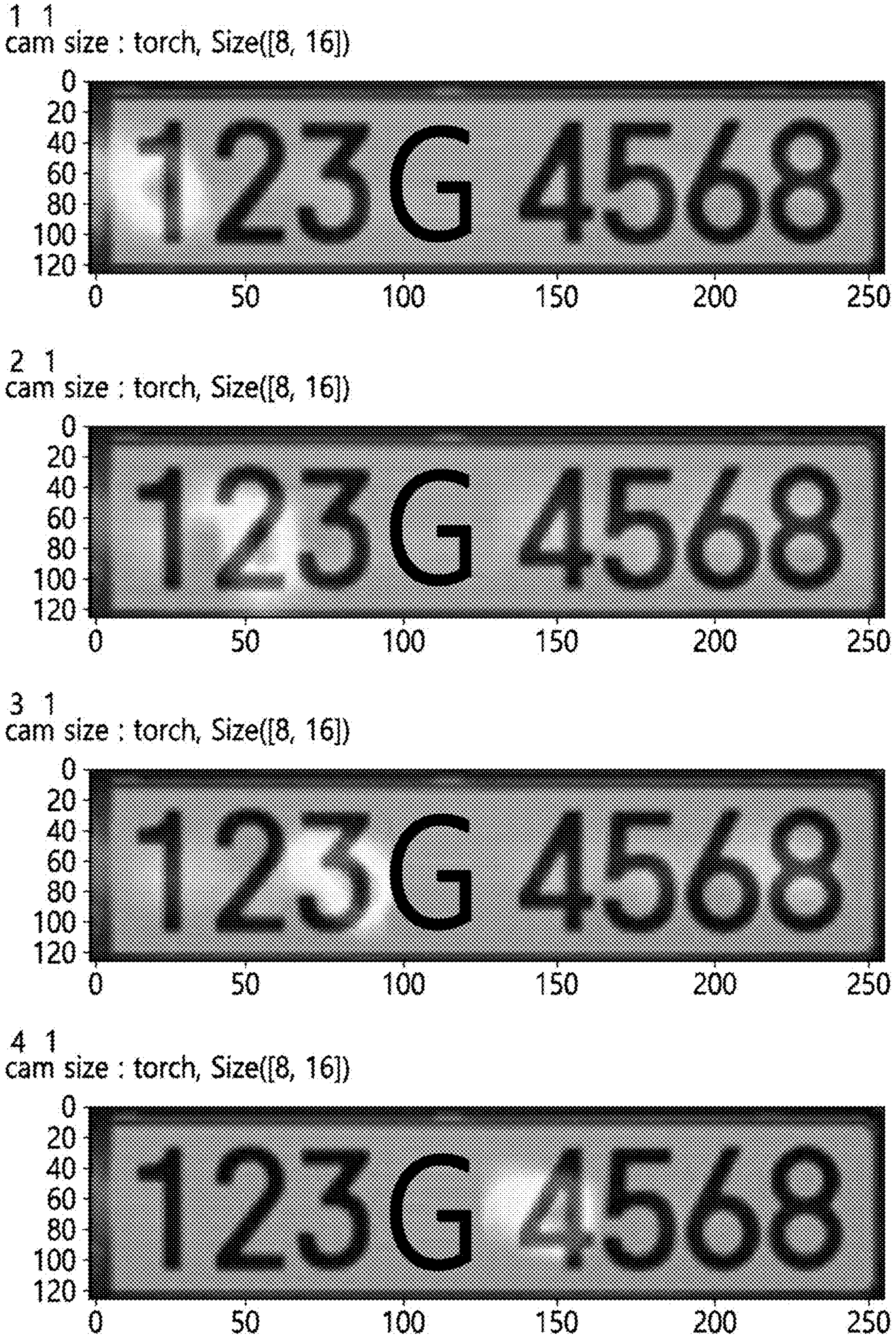
FIG. 3 is a diagram illustrating examples of class activation maps for the license plate of FIG. 2.

FIG. 1 is a schematic block configuration diagram of a license plate recognition apparatus based on weakly supervised localization according to an embodiment, FIG. 2 is a diagram illustrating an example of a license plate, and FIG. 3 is a diagram illustrating examples of class activation maps for the license plate of FIG. 2.

Referring to FIG. 1, a license plate recognition apparatus 100 based on weakly-supervised localization may include a recognition unit 110, a class activation map extraction unit 120, and a numeral location analysis unit 130.

The recognition unit 110 is configured to, when a license plate image is input, recognize and output one or more numerals present in the license plate image and the number of appearances of each of the numerals.

For example, when a license plate image such as that illustrated in FIG. 2 is input, results having the format of the following Table 1, in which the number of appearances of '1' is 1, the number of appearances of '2' is 1, the number of appearances of '3' is 1, the number of appearances of '4' is 1, the number of appearances of '5' is 1, the number of appearances of '6' is 1, and the number of appearances of '8' is 1, may be output.

TABLE 1

| |
|---|
| torch.Size([3, 128, 256)] |
| 1 tensor(1) |
| 2 tensor(1) |
| 3 tensor(1) |
| 4 tensor(1) |
| 5 tensor(1) |
| 6 tensor(1) |
| 8 tensor(1) |

In another example, assuming that a license plate is '123G4477', results indicating a format in which the number of appearances of '1' is 1, the number of appearances of '2' is 1, the number of appearances of '3' is 1, the number of appearances of '4' is 2, and the number of appearances of '7' is 2 may be output.

In an embodiment, a domestic license plate in which the license plate number of a vehicle is composed of eight characters is described by way of example, as illustrated in FIG. 2. However, this is only an example provided for convenience of description, and the present invention is not limited thereto. That is, it is apparent that the embodiment can be applied to foreign license plates in the same manner.

Here, the recognition unit 110 may recognize a license plate based on a pre-trained deep-learning neural network model. The deep-learning neural network model may be generated in advance by a learning apparatus 200, and a detailed description thereof will be made later with reference to FIG. 5.

Here, in an embodiment, the deep-learning neural network model may include a first layer for extracting features of the input license plate image and a second layer for calculating probabilities for respective classes based on the extracted features and outputting the class having the maximum probability values.

In an embodiment, the first layer may be a convolutional layer for generating a feature map in which various features of an input image are represented, and the second layer may be a fully-connected layer (FCN) for sorting numerals present in the image based on the feature map.

Therefore, the recognition unit 110 may include a feature extraction unit 111 corresponding to the first layer of the deep-learning neural network model and a classification unit 112 corresponding to the second layer.

The class activation map extraction unit 120 may extract a Class Activation Map, (CAM) indicating the location of attention on the license plate image when the recognition unit 110 recognizes a specific numeral.

Here, the class activation map extraction unit 120 may hook the data output by the feature extraction unit 111 of the pre-trained deep-learning neural network model before the data is input to the classification unit 112, and may then extract the class activation map. That is, the location to which attention is paid when the recognition unit 110 determines classes is extracted. However, in another embodiment, the class activation map extraction unit 120 may hook the data output by any layer of the pre-trained deep-learning neural network model, and may then extract the class activation map.

Here, as the class activation map, a number of class activation maps identical to the number of numerals present on the license plate may be generated.

For example, referring to FIG. 3, the class activation map extraction unit 120 may extract class activation maps in which the locations to which the feature extraction unit 111 pays attention for respective classes corresponding to numerals '1', '2', '3', and '4' on the license plate are respectively indicated. Further, although not illustrated in FIG. 3, the class activation map extraction unit 120 may further extract class activation maps in which the locations to which the feature extraction unit 111 pays attention for respective classes corresponding to numerals '5', '6' and '7', on the license plate are respectively indicated.

The numeral location analysis unit 130 may output a license plate number in which the numerals recognized by the recognition unit 110 are arranged based on the class activation maps output from the class activation map extraction unit 120.

For example, for a license plate such as that shown in FIG. 2, the result of [1, 2, 3, 4, 5, 6, 8] may be output.

For this operation, the numeral location analysis unit 130 may determine the location of attention in the corresponding class activation map extracted when the recognition unit 110 recognizes a specific numeral to be the location of the specific numeral on the license plate.

That is, referring to FIG. 3, the location displayed to be activated in the corresponding class activation map when the recognition unit 110 recognizes '1' may be determined to be the location at which the numeral '1' is present, the location displayed to be activated in the corresponding class activation map when the recognition unit 110 recognizes '2' may be determined to be the location at which the numeral '2' is present, the location displayed to be activated in the corresponding class activation map when the recognition unit 110 recognizes '3' may be determined to be the location at which the numeral '3' is present, and the location displayed to be activated in the corresponding class activation map when the recognition unit 110 recognizes '4' may be determined to be the location at which the numeral '4' is present.

Here, the numeral location analysis unit 130 may determine the location of each numeral by analyzing two-dimensional (2D) peak information of the numeral present on the license plate, in the class activation map.

That is, when a 2D peak in the class activation map is analyzed, the greatest intensity appears at the location at which the recognition unit 110 pays attention to a specific numeral on the license plate.

Figure 4:
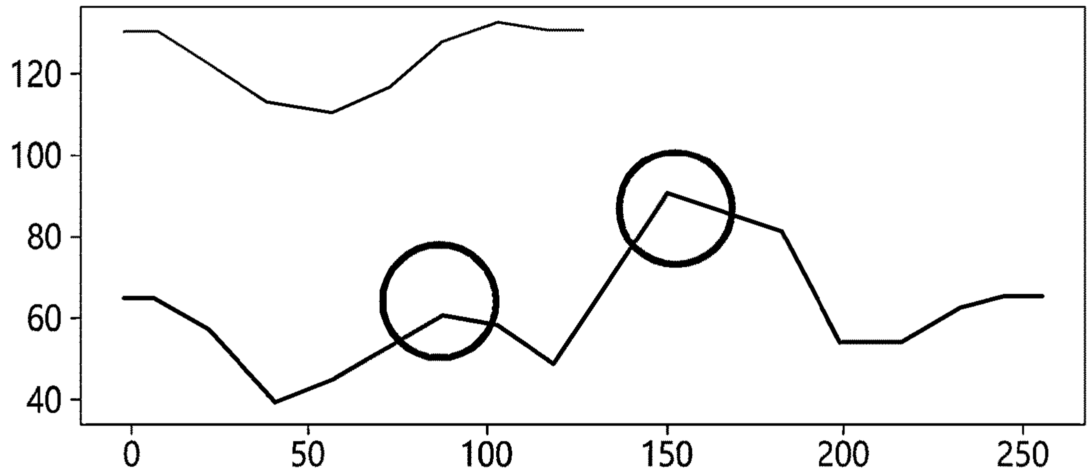
FIG. 4 is a diagram illustrating an example of a graph of a class activation map according to an embodiment.

For example, referring to FIG. 4, portions indicated by circles may be peaks, which mean that the intensities of the portions appear to be greater, thus indicating the locations at which attention is paid to specific numerals on the license plate.

Further, the numeral location analysis unit 130 detects the number of peaks in the corresponding class activation map based on the number of appearances of a specific numeral in the results of class recognition output from the recognition unit 110.

For example, referring to FIG. 4, the numeral location analysis unit 130 may search for two peaks for a specific numeral and determine respective locations corresponding to the two found peaks to be the locations of the corresponding numeral on the license plate based on a recognition result, obtained by the recognition unit 110, indicating that the number of appearances of the specific numeral is 2.

However, when the recognition result output from the recognition unit 110 indicates that the number of appearances of a specific numeral is 1, the numeral location analysis unit 130 finds one peak for the specific numeral. For example, even if several peaks appear as illustrated in FIG. 4, only one peak having the maximum value, among the multiple peaks, is found, and the location corresponding to the peak is determined to be the location of the specific numeral on the license plate.

Meanwhile, even if the recognition result output from the recognition unit 110 indicates that the number of appearances of a specific numeral is 2, the numeral location analysis unit 130 may extract one peak through analysis of the peaks on the class activation map. This corresponds to the case where a specific numeral appearing twice is present at consecutive locations, rather than at non-consecutive (i.e., separate) locations on the license plate, in which case only a single peak, rather than two peaks, may be extracted due to the low resolution of the class activation map.

In this case, the numeral location analysis unit 130 consecutively allocates the specific numeral twice at the location at which one peak is found.

Meanwhile, when peaks are extracted from the class activation map, the case where a peak of a 2D line (i.e., a horizontal peak or a vertical peak) is extracted, as illustrated in FIG. 4, has been described by way of example, but the present invention is not limited thereto. That is, it should be noted that, when peaks are extracted from the class activation map, a scheme for extracting peaks on a 3D surface, as well as peaks on a 2D line, for example, a scheme for extracting peaks from a shape such as a flat contour map, is also included in the scope of the present invention.

Figure 5:
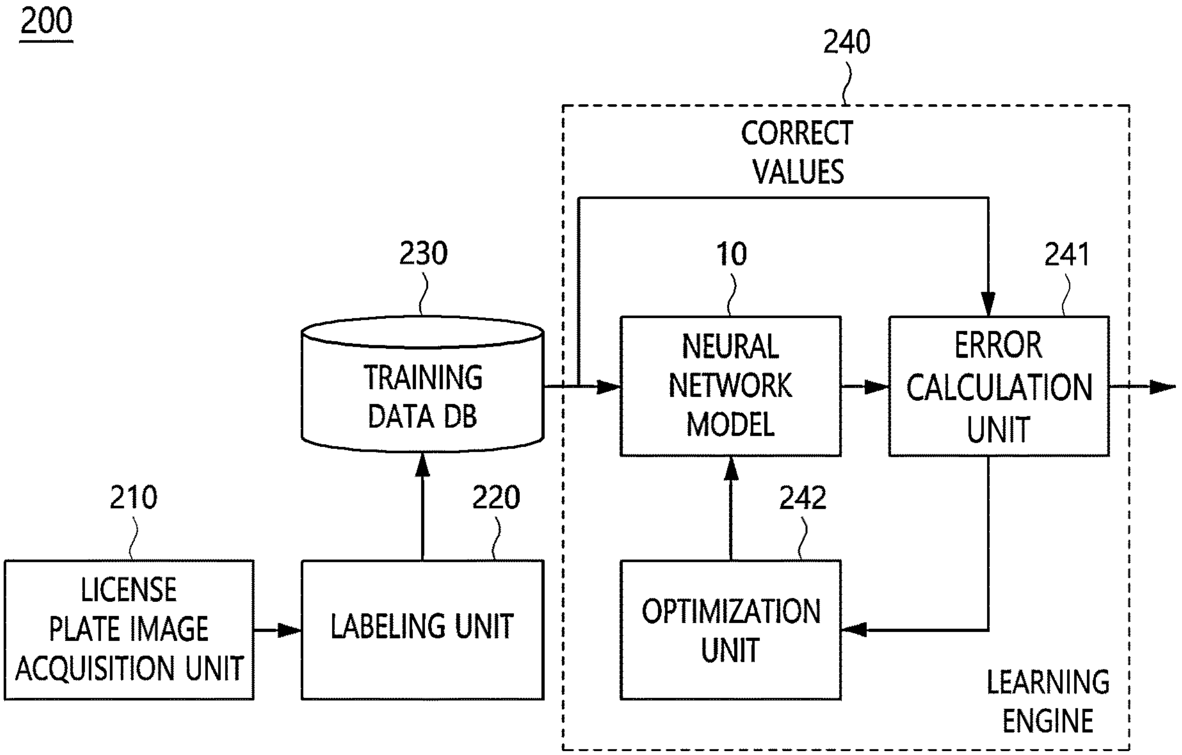
FIG. 5 is a schematic block configuration diagram of a learning apparatus according to an embodiment.

FIG. 5 is a schematic block configuration diagram of a learning apparatus according to an embodiment.

Referring to FIG. 5, a learning apparatus 200 may include a license plate image acquisition unit 210, a labeling unit 220, a training data database (DB) 230, and a learning engine 240, and may train a neural network model 10.

The license plate image acquisition unit 210 may acquire images obtained by capturing multiple license plates.

Here, the license plate images may be images captured in situations in which various conditions including illuminance, a capture angle, a capture distance, etc. are given. Thus, the neural network model 10 may be trained with image frames captured in various situations, thus enabling numerals to be accurately identified regardless of the situation in which images to be subsequently input are captured.

The labeling unit 220 generates training data in which the acquired license plate images are labeled with correct values. That is, training data labeled with one or more numerals included in each of multiple license plate images and the number of appearances of each of the numerals may be generated.

Here, the labeling unit 220 may convert the license plate number of a vehicle included in each license plate image into the number of appearances of each of numerals '0' to '9', and may convert the numbers of appearances of respective converted numerals into the form of a one-hot vector, thus finally labeling the training data.

That is, each vehicle image and a number label corresponding to the vehicle image are required for ground truth (GT) preparation so as to train the neural network model 10. In this case, although the number label is provided in the form of "123G4568', a ground truth (GT) is converted into the number of appearances of each numeral so as to perform training for weakly supervised localization. For example, the ground truth (GT) may be converted to indicate that the number of appearances of '1' is 1 and the number of appearances of '2' is 1. Thereafter, the GT is converted into the form of a one-hot vector, and the result of conversion may be used as a final label.

The training data generated in this way may be stored in the training data database (DB) 230.

The learning engine 240 may configure the neural network model 10, may input the training data stored in the training data DB 230 to the neural network model 10, and may then optimize the parameters of the deep-learning neural network so that errors between the numerals and the numbers of appearances of the numerals, output from the neural network model 10, and the labeled numerals and the numbers of appearances of the labeled numerals are minimized.

Here, the neural network model 10 may be, for example, a Convolutional Neural Network (CNN) algorithm-based model. However, this is only an embodiment, and the present invention is not limited thereto. That is, the neural network model 10 may be implemented using any of various learning algorithms.

A CNN has a shape in which multiple convolutional layers are attached to a stage prior to a traditional neural network, and is configured to extract features of an image received through the convolutional layers in the prior stage and to classify numerals using the neural network based on the features extracted in this way. That is, the CNN may include a convolutional layer for generating a feature map in which various features of an input image are represented, and the second layer may be a fully-connected layer (FCN) for sorting numerals present in the image based on the feature map.

Here, the fully-connected layer outputs a multi-class classification result, among classes corresponding to one or more numerals present in an input license plate image and the number of appearances of each of the numerals, as a probability value.

For example, in the case of a domestic license plate, such as that illustrated in FIG. 2, the number of classes may be 80, obtained by multiplying the maximum number of appearances, that is, 8, by each of 10 numerals from '0' to '9'.

The error calculation unit 241 of the learning engine 240 obtains an error by substituting the value from the neural network model 10 and the labeled correct values into a loss function or a cost function. Thereafter, the optimization unit 242 of the learning engine 240 updates training parameters through a back-propagation algorithm in the direction in which the cost function is minimized.

Figure 6:
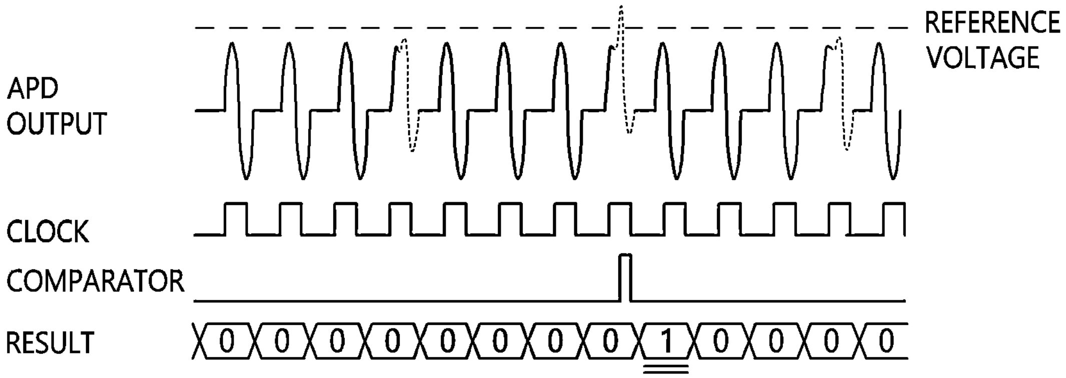
FIG. 6 is a flowchart illustrating a license plate recognition method based on weakly supervised localization according to an embodiment.
Figure 6:
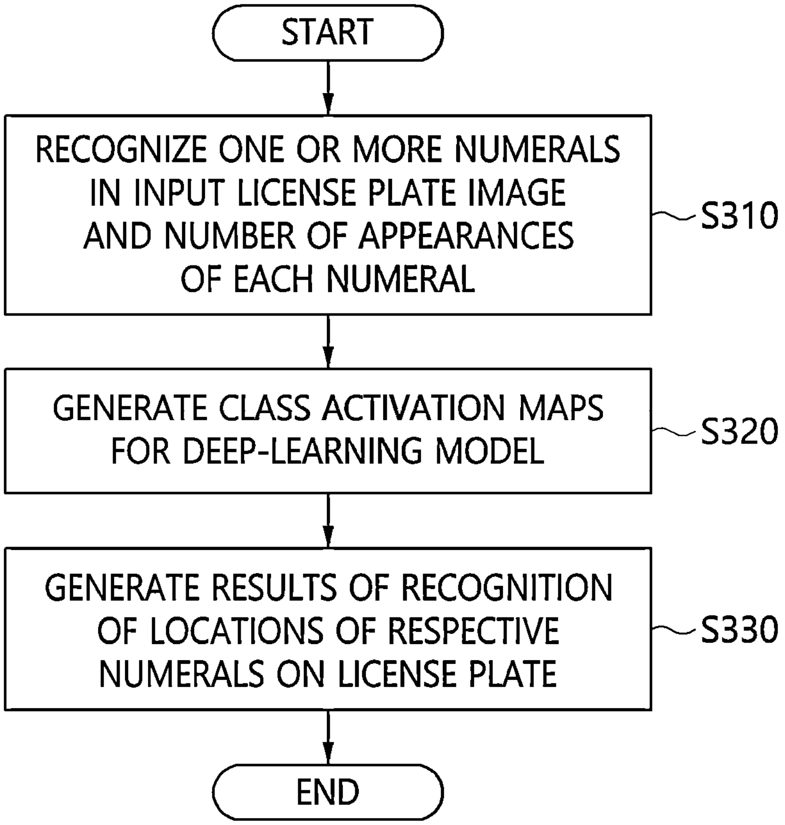

FIG. 6 is a flowchart illustrating a license plate recognition method based on weakly supervised localization according to an embodiment.

Referring to FIG. 6, the license plate recognition method based on weakly supervised localization may include step S310 of recognizing one or more numerals present in a license plate image and the number of appearances of each of the numerals, step S320 of extracting class activation maps in which the location of attention in the license plate image is indicated when a specific numeral is recognized, and step S330 of outputting a license plate number in which the recognized numerals are arranged based on the extracted class activation maps.

Here, recognizing step S310 may be performed based on a pre-trained deep-learning neural network model.

The deep-learning neural network model may be trained by the step of generating training data labeled with one or more numerals included in each of multiple license plate images and the number of appearances of each of the numerals, and the step of configuring a deep-learning neural network, inputting the generated training data to the deep-learning neural network, and repeatedly updating the parameters of the deep-learning neural network so that errors (differences) between numerals and the numbers of appearances of the numerals, output from the deep-neural network model, and the labeled numerals and the numbers of appearances of the labeled numerals are minimized.

Here, the step of generating the training data may include the step of converting the license plate number included in the license plate image into the number of appearances of each of numerals ranging from '0' to '9' and converting the numbers of appearances of respective numerals into a one-hot vector, thus finally labeling the training data.

Here, the deep-learning neural network model may include a first layer for extracting features of the input license plate image and a second layer for calculating probabilities for respective classes based on the extracted features and outputting the class having the maximum probability values.

Here, step S320 of extracting the class activation maps may include hooking the output of the first layer of the pre-trained deep-learning neural network model and then extracting the class activation maps. However, in another embodiment, step S320 of extracting the class activation maps may include hooking the output of any layer of the pre-trained deep-learning neural network model, and then extracting the class activation maps.

Here, step S320 of extracting the class activation maps may include extracting a number of class activation maps corresponding to the number of the numerals present on the license plate.

Here, step S330 of outputting the license plate number may include determining the location of attention to the specific numeral in the corresponding class activation map extracted at the time of recognizing the specific numeral to be the location of the corresponding specific numeral in the license plate.

In this case, step S330 of outputting the license plate number may include analyzing 2D peak information of each numeral, present on the license plate, in the class activation maps, thus detecting the location of the numeral.

Figure 7:
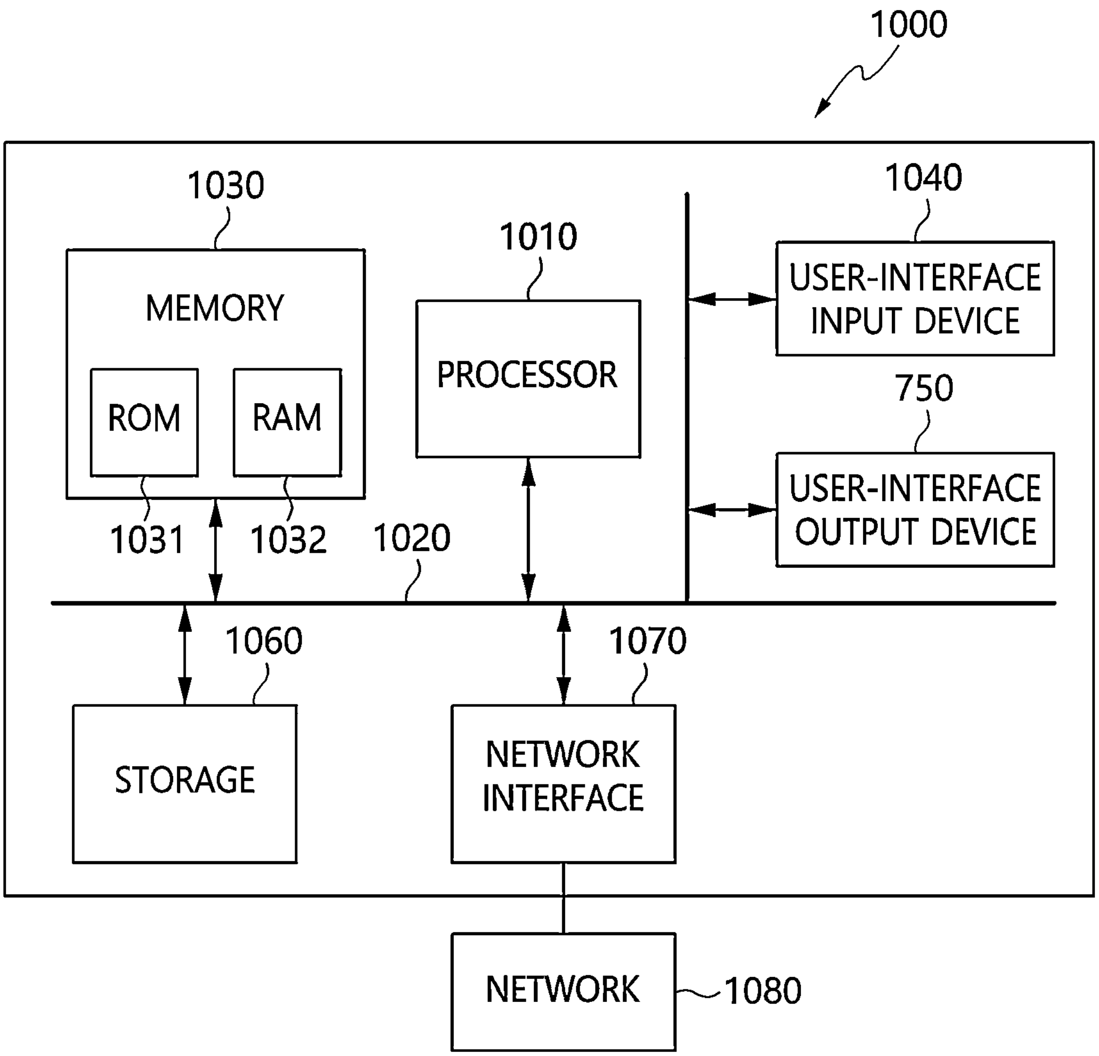
FIG. 7 is a diagram illustrating the configuration of a computer system according to an embodiment.

FIG. 7 is a diagram illustrating the configuration of a computer system according to an embodiment.

Each of a formalized character set recognition apparatus 100 based on weakly-supervised localization and a learning apparatus 200 according to embodiments may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, or an information delivery medium. For example, the memory 1030 may include Read-Only Memory (ROM) 1031 or Random Access Memory (RAM) 1032.

In accordance with an embodiment, reading performance for a formalized character set may be improved even for a low-quality image.

In accordance with an embodiment, reading speed for a formalized character set may be improved compared to a conventional OCR scheme.

In accordance with an embodiment, reading of new types of formalized character set that are not included in learned data is enabled.

Although the embodiments of the present invention have been disclosed with reference to the attached drawing, those skilled in the art will appreciate that the present invention can be implemented in other concrete forms, without changing the technical spirit or essential features of the invention. Therefore, it should be understood that the foregoing embodiments are merely exemplary, rather than restrictive, in all aspects.

What is claimed is:

1. A formalized character set recognition apparatus based on weakly supervised localization, comprising:

a memory for storing at least one program; and a processor for executing the program, wherein the program performs:

recognizing one or more numerals present in a formalized character set image and a number of appearances of each of the numerals;

extracting a class activation map in which a location of attention in the formalized character set image is indicated when a specific numeral is recognized; and outputting a formalized character set number in which numerals recognized based on the extracted class activation map are arranged, wherein outputting the formalized character set number comprises determining locations of the recognized numerals in the class activation map based on a number of appearances of corresponding numerals.

2. The formalized character set recognition apparatus of claim 1, wherein:

recognizing the one or more numerals and the number of appearances is performed based on a pre-trained deep-learning neural network model, and the program is configured to train the deep-learning neural network model by performing:

generating training data labeled with one or more numerals included in each of multiple formalized character set images and a number of appearances of each of the numerals; and configuring a deep-learning neural network, inputting the generated training data to the deep-learning neural network, and then repeatedly updating parameters of the deep-learning neural network so that errors between one or more numerals and a number of appearances of each of the numerals, output from the deep-learning neural network, and the labeled numerals and the number of appearances of each of the labeled numerals are minimized.

3. The formalized character set recognition apparatus of claim 2, wherein generating the training data comprises:

converting a formalized character set number included in a corresponding formalized character set image into a number of appearances of each of numerals ranging from ‘0’ to ‘9’; and converting converted numbers of appearances of respective numerals into a one-hot vector, thus finally labeling the training data.

4. The formalized character set recognition apparatus of claim 1, wherein:

recognizing the one or more numerals and the number of appearances is performed based on a pre-trained deep-learning neural network model, wherein the deep-learning neural network model comprises:

a first layer for extracting features of the formalized character set image; and a second layer for calculating probabilities for respective classes based on the extracted features and outputting a class having maximum probability values.

5. The formalized character set recognition apparatus of claim 4, wherein extracting the class activation map comprises hooking output of the first layer of the pre-trained deep-learning neural network model and extracting the class activation map.

6. The formalized character set recognition apparatus of claim 1, wherein extracting the class activation map comprises extracting a number of class activation maps identical to a number of numerals present in a corresponding formalized character set.

7. The formalized character set recognition apparatus of claim 1, wherein outputting the formalized character set number comprises determining a location of attention in the class activation map, extracted at a time of recognizing the specific numeral, to be a location of a corresponding specific numeral on the formalized character set.

8. A formalized character set recognition method based on weakly supervised localization, comprising:

recognizing one or more numerals present in a formalized character set image and a number of appearances of each of the numerals;

extracting a class activation map in which a location of attention in the formalized character set image is indicated when a specific numeral is recognized; and outputting a formalized character set number in which numerals recognized based on the extracted class activation map are arranged, wherein outputting the formalized character set number comprises determining locations of the recognized numerals in the class activation map based on a number of appearances of corresponding numerals.

9. The formalized character set recognition method of claim 8, wherein:

recognizing the one or more numerals and the number of appearances is performed based on a pre-trained deep-learning neural network model, and the deep-learning neural network model is trained by performing:

generating training data labeled with one or more numerals included in each of multiple formalized character set images and a number of appearances of each of the numerals; and configuring a deep-learning neural network, inputting the generated training data to the deep-learning neural network, and then repeatedly updating parameters of the deep-learning neural network so that errors between one or more numerals and a number of appearances of each of the numerals, output from the deep-learning neural network, and the labeled numerals and the number of appearances of each of the labeled numerals are minimized.

10. The formalized character set recognition method of claim 9, wherein generating the training data comprises:

converting a formalized character set number included in a corresponding formalized character set image into a number of appearances of each of numerals ranging from ‘0’ to ‘9’; and converting converted numbers of appearances of respective numerals into a one-hot vector, thus finally labeling the training data.

11. The formalized character set recognition method of claim 10, wherein the deep-learning neural network model comprises:

a first layer for extracting features of the input formalized character set image; and a second layer for calculating probabilities for respective classes based on the extracted features and outputting a class having maximum probability values.

12. The formalized character set recognition method of claim 11, wherein extracting the class activation map comprises hooking output of the first layer of the pre-trained deep-learning neural network model and extracting the class activation map.

13. The formalized character set recognition method of claim 8, wherein extracting the class activation map comprises extracting a number of class activation maps identical to a number of numerals present in a corresponding formalized character set.

14. The formalized character set recognition method of claim 8, wherein outputting the formalized character set number comprises determining a location of attention in the class activation map, extracted at a time of recognizing the specific numeral, to be a location of the corresponding specific numeral on the formalized character set.

15. A formalized character set recognition method based on weakly supervised localization, comprising:

recognizing one or more numerals present in a formalized character set image and a number of appearances of each of the numerals based on a pre-trained deep-learning neural network model;

extracting a class activation map in which a location of attention in the formalized character set image is indicated when a specific numeral is recognized; and outputting a formalized character set number in which numerals recognized based on the extracted class activation map are arranged, wherein the deep-learning neural network model is pre-trained with training data that is labeled with one or more numerals included in each of multiple formalized character set images and a number of appearances of each of the numerals, wherein outputting the formalized character set number comprises determining locations of the recognized numerals in the class activation map based on a number of appearances of corresponding numerals.

16. The formalized character set recognition method of claim 15, wherein:

the deep-learning neural network model comprises:

a first layer for extracting features of the input formalized character set image; and a second layer for calculating probabilities for respective classes based on the extracted features and outputting the class having maximum probability values, and extracting the class activation map comprises hooking output of the first layer of the pre-trained deep-learning neural network model and extracting the class activation map.

17. The formalized character set recognition method of claim 16, wherein extracting the class activation map comprises extracting a number of class activation maps identical to a number of numerals present in a corresponding formalized character set.

* * * * *